(12) United States Patent
Bailey et al.

(10) Patent No.: US 7,953,452 B2
(45) Date of Patent: May 31, 2011

(54) CELLULAR MULTISCREEN SYSTEM

(75) Inventors: Kenneth Stephen Bailey, Newport Beach, CA (US); Christopher Carmichael, Laguna Niguel, CA (US)

(73) Assignee: Ubiquity Holdings, Inc, San Juan Capistrano, CA (US)

( * ) Notice: Subject to any disclaimer, the term of this patent is extended or adjusted under 35 U.S.C. 154(b) by 822 days.

(21) Appl. No.: 11/854,462

(22) Filed: Sep. 12, 2007

(65) Prior Publication Data
US 2008/0139229 A1 Jun. 12, 2008

Related U.S. Application Data

(60) Provisional application No. 60/844,205, filed on Sep. 12, 2006.

(51) Int. Cl.
*H04M 1/00* (2006.01)
*H04B 1/38* (2006.01)
(52) U.S. Cl. ............... 455/566; 455/145; 455/158.4; 345/1.1; 345/2.3

(58) Field of Classification Search ............... 455/41.1, 455/41.2, 41.3, 550.1, 566, 145, 151.1, 151.2, 455/154.2, 158.4; 345/1.1, 2.3, 103, 901
See application file for complete search history.

(56) References Cited

U.S. PATENT DOCUMENTS

| | | | |
|---|---|---|---|
| 7,242,369 B2* | 7/2007 | Huang | 345/1.1 |
| 2003/0220841 A1* | 11/2003 | Maritzen | 705/26 |
| 2004/0203505 A1* | 10/2004 | Newman et al. | 455/90.3 |
| 2006/0116164 A1* | 6/2006 | Kang | 455/557 |

* cited by examiner

*Primary Examiner* — Lana N Le
*Assistant Examiner* — Ping Y Hsieh
(74) *Attorney, Agent, or Firm* — Law Office of Scott C. Harris

(57) ABSTRACT

A cellular multiscreen system forms an image which can be a frame of a video or still image, divides that image into a number of parts, and sends each part to a different cellular telephone. The cellular telephones which receives the images collectively can display the images so that one can see the original image by looking at the multiple different cellular telephones. A game can also be played by determining which of the cellular phones receive which portion of the image.

7 Claims, 4 Drawing Sheets

CELLULAR MULTISCREEN SYSTEM

CROSS-REFERENCE TO RELATED APPLICATIONS

This application claims priority to U.S. Provisional Application 60/844,205, filed Sep. 12, 2006. The disclosure of the prior application is considered part of (and is incorporated by reference in) the disclosure of this application.

BACKGROUND

Many different applications for cellular phones are known. Cellular phones now are often equipped with MP3 players, video cameras, color display screens, and GPS tracking. Cellular phones promise wideband Internet access capability using Wimax and other analogous technologies to deliver streaming video, live television broadcasts and interactive gaming.

Images may be divided and shown on smaller screens. See, for example, U.S. Pat. No. 5,161,012, and application publication number 2003/0007564.

SUMMARY

The present application teaches a special activity for multiple cellular phone users, which provides a cellular display which provides multiplex viewing.

DETAILED DESCRIPTION

The general structure and techniques, and more specific embodiments which can be used to effect different ways of carrying out the more general goals, are described herein.

Figure 1:
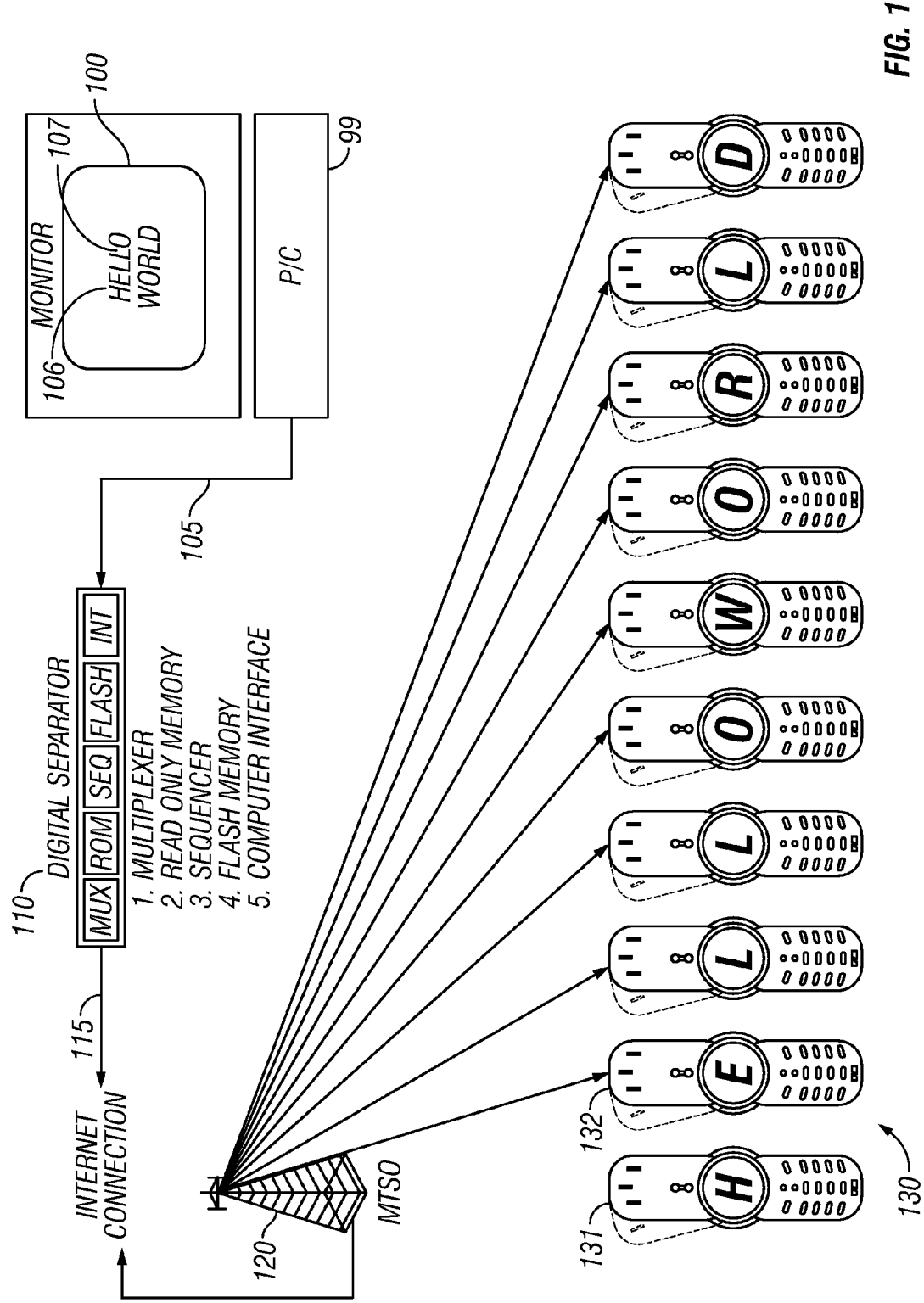
FIG. 1 illustrates a cellular displayed multiplex viewing system which is formed using plural different cellular phone users participating in a group activity.

FIG. 1 illustrates a cellular displayed multiplex viewing system which is formed using plural different cellular phone users participating in a group activity. The system allows several customers to connect to the same streaming video source. The customers each obtain a different piece of the total video that is to be viewed.

The pieces of a motion picture or a message can be collectively viewed on the multiple different display screens. This way, when the screens are viewed together, the collective viewing provides the complete moving picture. However, no single display provides the whole picture.

This technique can be used for viewing videos, or for a new form of video game that can be played on multiple user screens, in which multiple users become the collective participants of a current game. By so doing, an entirely new paradigm of playing the game becomes possible. Another advantage of this system is that since the games or videos are often displayed on small screens, such as the small screen of a cellular phone, this system enables the overall viewing screen to be larger than any single viewing screen.

The present application shows using multiple different display screens on multiple different phones. FIG. 1 illustrates the overall screen 100, here showing the words "hello world". This is shown on a host PC 99, but could be displayed on any suitable host, such as a host computer running at a cellular carrier station. The view on the monitor can be more generally any frame or image that can be viewed on any remote device.

The image is sent 105 as an electrical signal to a digital separator 110. The digital separator 110 parses the image into a number of different component parts. For example, the image may be broken up into different component parts that are not connected to each other as in FIG. 1. Alternatively, the image may be broken up geometrically.

Within the screen 100, note that the H letter 106 is totally disconnected from the E letter 107. The separator may use various kinds of digital processing techniques to separate the overall screen 100 into a number of different sub screens of a type that can each be displayed on different small screens. The separated image 115 is sent from the cellular transmitter 122 to a number of different receivers, shown collectively as 130. Each receiver, such as 131, receives only a part of the overall message. For example, 131 receives the letter H, while 132 receives the letter E. Collectively, all of these devices receive the entire image, and it is displayed separately.

In an embodiment, this system may bridge different cellular phone networks by sending portions over different networks.

In the embodiment, a video transmission can be displayed on several cellular display screens simultaneously, in a way such that if the various displays are held side-by-side in the proper arrangement, they form a recognizable image of a combination of the collective smaller images.

The separation done by the digital separator 110 can select the number of separations. Alternatively, this can be selected by the number of people who are attempting to collectively view the media e.g. a video or an image. In an example where all the participants can all view each other's cellular phone display screens simultaneously, the original picture may be fragmented into as many pieces as there are participants. There may be 100 or 500 persons for example, or, as in the example shown in FIG. 1, there may be only 10 participants.

In one embodiment, the participants cannot necessarily view each other participant's display screens, and there may be many more participants.

A video image can be divided up into random parts like a jigsaw puzzle when many display screens are used in this way.

An important issue may be pixel conversions. A cellular display screen may display in the range of 100's by 100's of pixels per frame, while a high definition television program may display 1920 by 1080 pixels. So while the High Definition TV requires 2 million pixels per frame, a cellular phone display may display 96×80 pixels, or ¹⁄₂₇₀th the number of pixels as in the HDTV.

More modern cellular phone displays may have 10 times more, for example 240×320 pixels per frame. Still, even with these most modern display screens, the phone has a very small fraction of the number of pixels in the larger phone.

Take an example of a surfer riding a surfboard in the ocean. That 2 million pixel per frame HDTV image could be reduced into 270 parts. However most of those parts would simply show various shades of blue images representing the blue water of the ocean. Only a few of the parts would show the image of the surfer and the surfboard.

The parts showing only the ocean would change very little from frame to frame. However, the surfer's image on the few screens it appears, would move quite a bit as the surfer moves through the waves. Motion estimation techniques can hence be used to reduce the amount of information that is sent for the background, in order to minimize bandwidth consumption. Moreover, the part of the system that is moving, the surfer riding the surfboard between different screens, would produce quite a lot of interest as the surfer moves between the different screens of the different cellular phone users.

Action video clips would also produce interest. The background images in such a video clip such as a high-speed car chase are predominantly in motion. Since these are not static, a less aggressive compression method might be used for these background images.

In an embodiment shown in FIG. 1, the cellular phones are placed side-by-side in a column or row, allowing the overall image to appear to flow from one screen to another, and provide the visual experience of a larger screen viewing area. A linear arrangement such as shown in FIG. 1 allows an image of a skateboarder or surfer to move from one phone display to another phone in the series and so on.

Another embodiment uses these multiple screens to piece together a puzzle.

Figure 2:
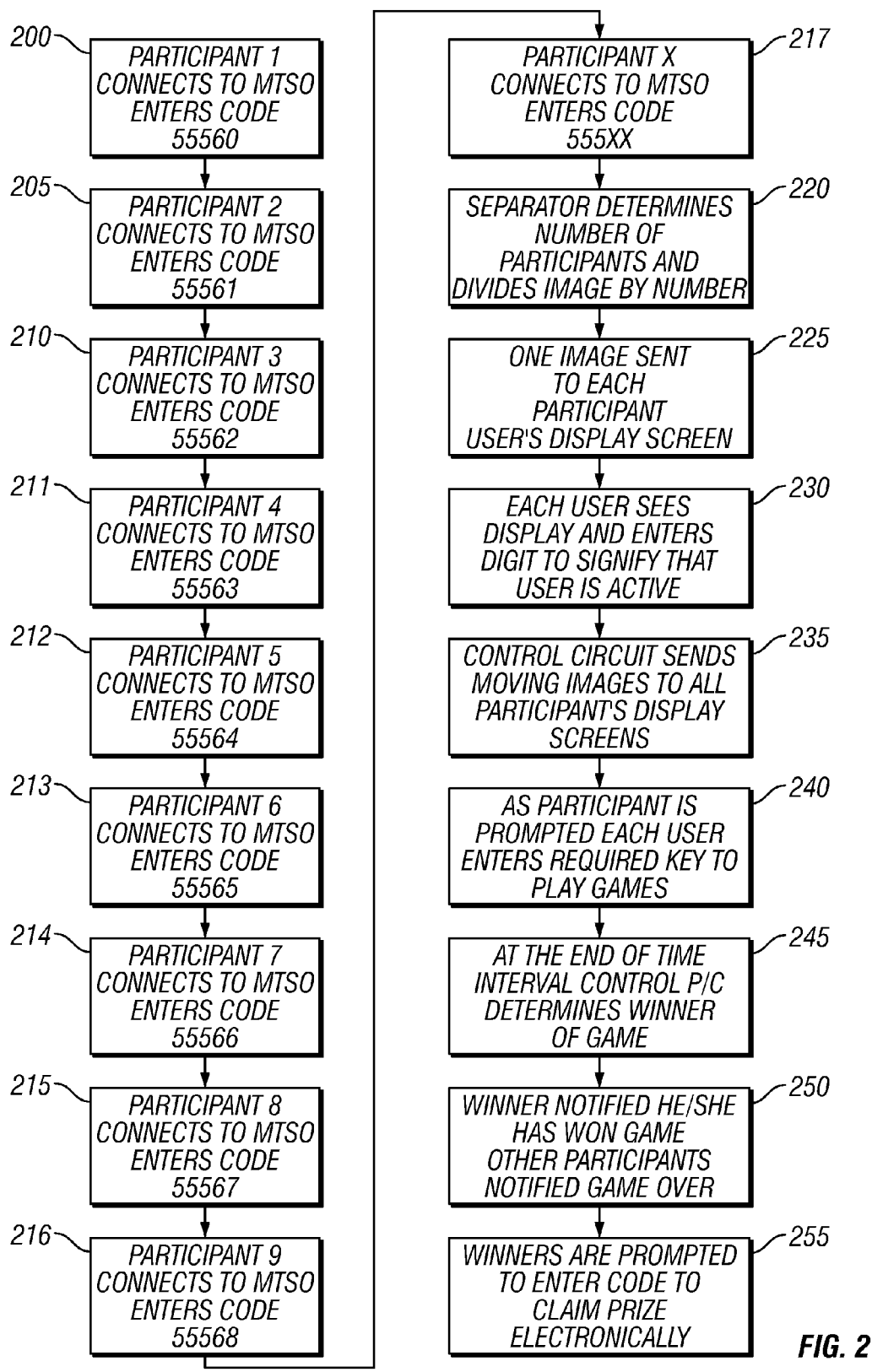
FIG. 2 illustrates how this can be used in a gaming scenario.

FIG. 2 illustrates how this can be used in a gaming scenario. Each participant needs to enter a code. 200 illustrates the first participant, while 205 and 210-217 represent participants 1-9 and participant_x where participant_x is the last participant in the series. After all the participants have joined, 220 represents the operation where the separator 110 determines the number of participants and divides the image by a number related to that number of participants.

At 225, one image is sent to each participant user's display screen. 230 illustrates each user seeing the display and entering a digit to signify that user is active and viewing the screen. If the digit is not received by the controller for the digital separator 110, it assumes that user is not active, and either adds a new user, or re-formulates the image to fit on fewer screens.

For a game embodiment, the system notes that as the video progresses, the moving part of the image is eventually sent to all the participants' display screens. Each participant is prompted at 240 to press a key to play the game. At the end of the time interval at 245, the controlling computer determines the winner of the game, based on the interaction. For example, each user may be required to enter a key every time they see the actor or moving part come onto their screen, or whenever the actor takes a specified pose on their screen. As an alternative, the game may be totally locked, where the system counts each time the actor comes on the screen. Eventually, the player with the highest count wins the game. The winner is notified at 250, and prompted at 255 to electronically claim a prize.

Figure 3:
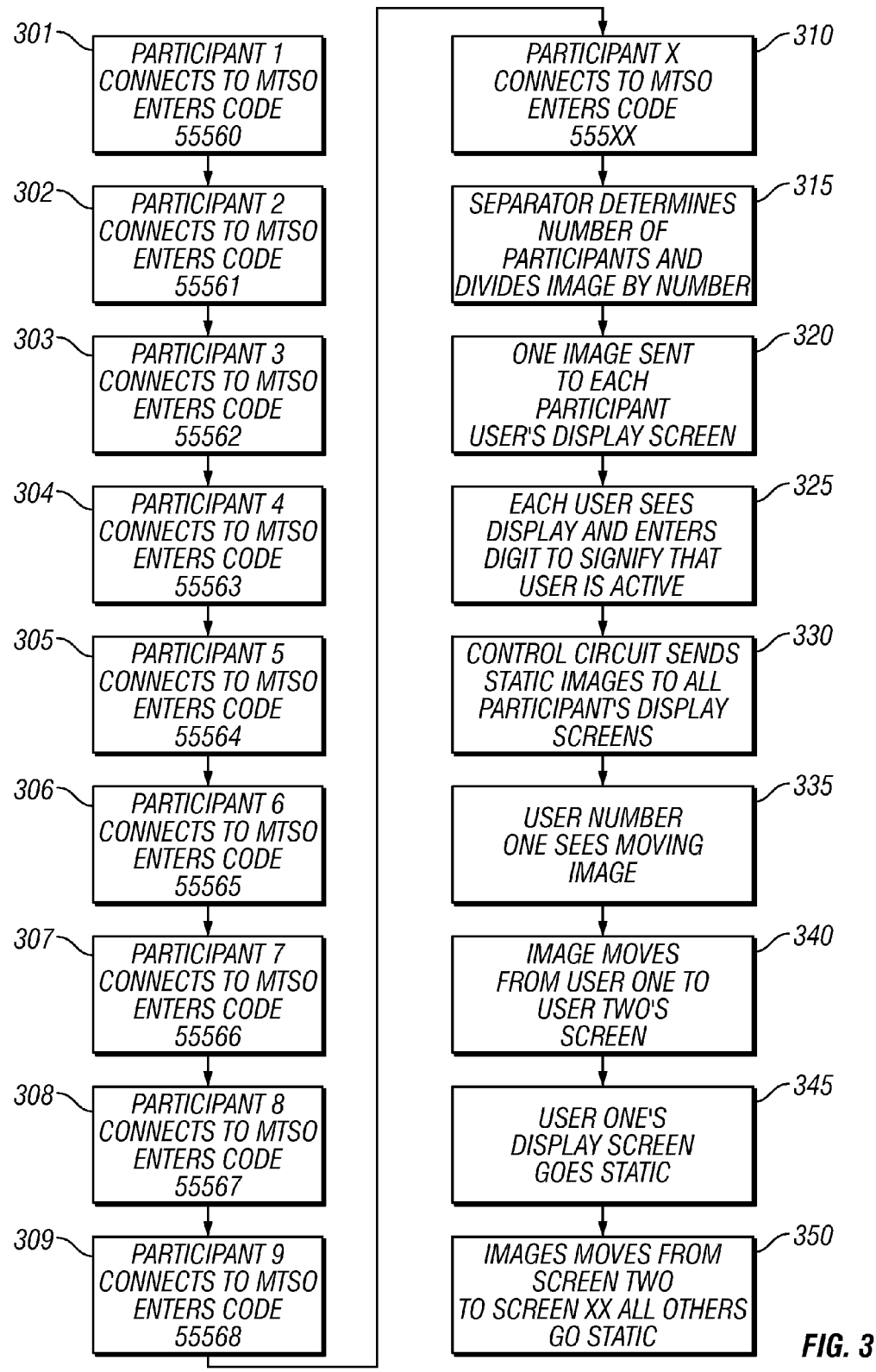
FIG. 3 represents displaying a video across multiple multiplexed phones.

FIG. 3 represents displaying the operation.

301 to 310 represents x participants joining. As in FIG. 2, the separator determines the number of participants at 315 and divides the image by the number. One image is sent to each participant at 320. Each user sees the display at 325 and enters a digit to signify that user is active.

The above has described many users enrolling to obtain the information on their cellular phones, but it should also be understood that other techniques can be used such as determining which cellular phones have been turned on, or which have dialed a number, or the like. The process of determining how many phones are seeing the image or video may be totally automated.

The control circuits can send static images to all participant's display screens at 330. 335 illustrates how user number 1 sees a moving image but 340 shows how the image can move from user 1's screen to user 2's screen, at which point 345 illustrates user 1's display screen going static. 350 illustrates the process continuing. In other words, the actor may move from screen to screen.

Figure 4:
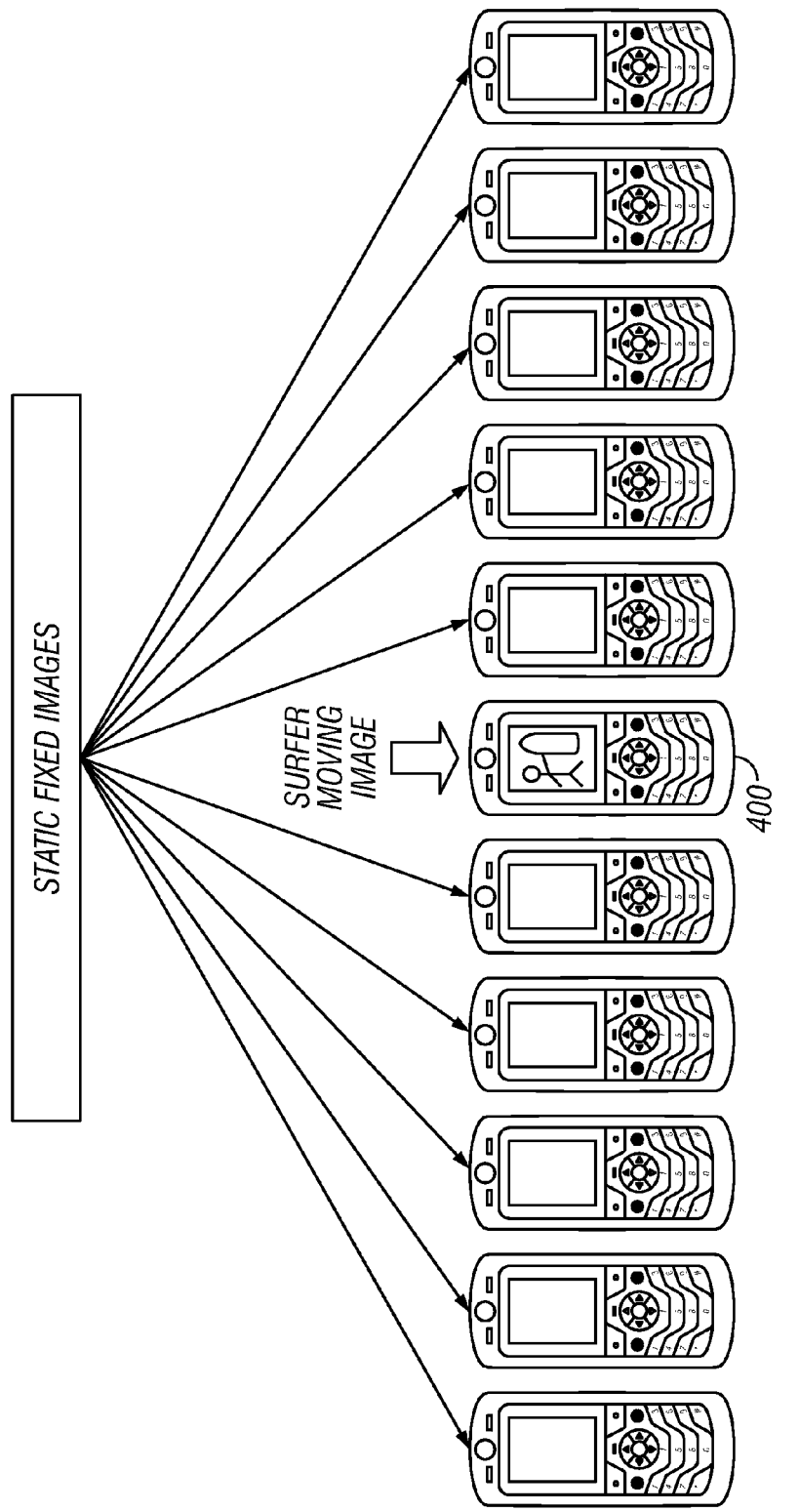
FIG. 4 shows how the moving image may move between the screens.

FIG. 4 shows how the moving image may move between the screens, where there are static fixed images on multiple of the units, but only one unit, shown here as 400, actually has the actor on the screen.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other forms of breaking up the image are contemplated, and other clients are contemplated.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A device, comprising:
a first part, which obtains frames of videos to be displayed as images at different times;
a dividing part, which separates the images into multiple different pieces, said multiple different pieces being a number that is substantially the same as a number of cellular phones that obtain the images to be displayed; and
a transmitter, which transmits said multiple different pieces which collectively make up the image to said number of cellular phones, each of said pieces being transmitted to a different cellular phone, wherein said first frame has a first actor that is shown on a first of said cellular phones in a first frame of the video, and has a second frame of the video that has said actor shown on a second one of said cellular phones but not on said first one of said cellular phones, wherein said transmitter transmits other information from said first and second frames on others of said cellular phones other than said first and second cellular phones.

2. A device as in claim 1, wherein said image is part of a game played using said multiple cellular phones.

3. A device, comprising:

a first part, which obtains frames of videos to be displayed as images at different times;

a dividing part, which separates the images into multiple different pieces, said multiple different pieces being a number that is substantially the same as a number of cellular phones that obtain the images to be displayed; and a transmitter, which transmits said multiple different pieces which collectively make up the image to said number of cellular phones, each of said pieces being transmitted to a different cellular phone, wherein said image comprises an image with text therein, and said image is divided by said dividing part so that each phone shows an integer number of characters making up the text, where said integer number of characters is less than a complete word.

4. A device, comprising:

a first part, which obtains an image to be displayed;

a determination part, which determines based on a criterion, how many cellular phones will be used to collectively receive the image to be displayed;

a dividing part, which separates the image into multiple different pieces, said multiple different pieces being a number that is substantially the same as the number of cellular phones that obtain the image to be displayed; and a transmitter, which transmits said multiple different pieces which collectively make up the image to said number of cellular phones, each of said different pieces being transmitted to a different cellular phone, wherein said image comprises a frame of a video, wherein a first frame of the video has an actor that is shown on a first of said cellular phones, and has a second frame of the video that has said actor shown on a second one of said cellular phones but not on said first one of said cellular phones, and wherein other cellular phones besides said first and second cellular phones show background.

5. A method, comprising:

obtaining an image associated with playing a game;

dividing said image into multiple different sub images;

transmitting each of said sub images to a different cellular phone; and on each of said cellular phones, playing a game using said sub images; and maintaining a score based on said playing said game, wherein said image includes at least one person and at least one background portion, and said game is played by determining which phone of said plurality of phones gets the most images of the person.

6. A method, comprising:

obtaining an image to be sent to plural different cellular phones;

automatically determining how many cellular phones will receive the image;

dividing the image into multiple different parts, said parts of an amount that is equal to the number of cellular phones that will receive the image;

sending said multiple different parts to said multiple different cellular phones, so that each cellular phone receives only part of the image; and on each of the multiple different cellular phones, displaying said part of the image that is received, wherein said image is a text image, and said dividing divides the text image in a way to provide specified characters on specified phones, where each phone gets only a portion of a word within said text image.

7. A method as in claim 6, wherein said only a portion of the word received by each phone is only a single character.

* * * * *